United States Patent
DeLuca et al.

(10) Patent No.: US 9,680,701 B2
(45) Date of Patent: *Jun. 13, 2017

(54) DIFFERENTIATING IMAGE FILES IN A NETWORKED COMPUTING ENVIRONMENT

(71) Applicant: International Business Machines Corporation, Armonk, NY (US)

(72) Inventors: Lisa Seacat DeLuca, San Francisco, CA (US); Soobaek Jang, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 445 days.

This patent is subject to a terminal disclaimer.

(21) Appl. No.: 14/259,251

(22) Filed: Apr. 23, 2014

(65) Prior Publication Data

US 2014/0229591 A1 Aug. 14, 2014

Related U.S. Application Data

(63) Continuation of application No. 12/938,702, filed on Nov. 3, 2010, now Pat. No. 8,775,575.

(51) Int. Cl.
*H04L 12/24* (2006.01)
*G06F 9/50* (2006.01)

(52) U.S. Cl.
CPC ........ *H04L 41/0813* (2013.01); *G06F 9/5077* (2013.01)

(58) Field of Classification Search
CPC ............................ H04L 41/0813; G06F 9/5077

USPC .................................................. 709/220, 221
See application file for complete search history.

(56) References Cited

U.S. PATENT DOCUMENTS

| | | | |
|---|---|---|---|
| 7,496,613 B2 | 2/2009 | Raghunath | |
| 8,219,653 B1* | 7/2012 | Keagy | G06F 8/63 709/222 |
| 2003/0051021 A1 | 3/2003 | Hirschfeld et al. | |
| 2004/0215754 A1* | 10/2004 | Orleth | G06F 9/4411 709/223 |
| 2005/0091291 A1* | 4/2005 | Kaler | G06F 8/71 |
| 2006/0047792 A1* | 3/2006 | Dharmarajan | H04L 29/06 709/220 |

(Continued)

OTHER PUBLICATIONS

Maitland, J., "Keeping Control Isn't Easy", Chapter 4: Cloud-Based Infrastructure, SearchCloudcomputing.com, 13 pages.

(Continued)

*Primary Examiner* — Michael C Lai
(74) *Attorney, Agent, or Firm* — William H. Hartwell; Hunter E. Webb; Keohane & D'Alessandro PLLC

(57) ABSTRACT

In general, embodiments of the invention provide an approach to differentiate and/or customize image files in a networked (e.g., cloud) computing environment. Specifically, a plurality of images corresponding to a requested instance, and all configuration files corresponding to the plurality of images, will be identified. In identifying the configuration files, a first subset of configuration files that are common to all of the plurality of images, and a second subset of configuration files that are unique to individual images will be determined. The user can then individually select configuration files from the two subsets, and the requested instance can be generated based thereon.

20 Claims, 7 Drawing Sheets

(56) References Cited

U.S. PATENT DOCUMENTS

| | | | |
|---|---|---|---|
| 2007/0266027 A1* | 11/2007 | Gattegno | G06F 3/0605 |
| 2008/0091763 A1 | 4/2008 | Devonshire et al. | |
| 2008/0244595 A1* | 10/2008 | Eilam | G06F 8/10 718/104 |
| 2009/0031008 A1* | 1/2009 | Elliott | H04L 61/1517 709/220 |
| 2009/0036111 A1 | 2/2009 | Danford et al. | |
| 2009/0300607 A1* | 12/2009 | Ferris | G06F 9/45558 718/1 |
| 2009/0300608 A1 | 12/2009 | Ferris et al. | |
| 2010/0088150 A1 | 4/2010 | Mazhar et al. | |
| 2010/0131948 A1* | 5/2010 | Ferris | G06F 9/50 718/1 |
| 2010/0146507 A1* | 6/2010 | Kang | G06F 9/45533 718/1 |

OTHER PUBLICATIONS

Mell, et al., "The NIST Definition of Cloud Computing", National Institute of Standards and Technology, Information Technology Laboratory, Version 15, Oct. 7, 2009, 2 pages.
Michael C. Lai, USPTO Office Action, U.S. Appl. No. 12/938,702, Mail Date Nov. 14, 2012, 22 pages.
Michael C. Lai, USPTO Final Office Action, U.S. Appl. No. 12/938,702, Mail Date Apr. 24, 2013, 20 pages.
Michael C. Lai, USPTO Office Action, U.S. Appl. No. 12/938,702, Mail Date Aug. 16, 2013, 32 pages.
Michael C. Lai, USPTO Notice of Allowance and Fee(s) Due, U.S. Appl. No. 12/938,702, Mail Date Feb. 11, 2014, 68 pages.
Maitland, J., "Keeping Control Isn't Easy", Chapter 4: Cloud-Based Infrastructure, SearchCloudComputing.com, Publication Date: Oct. 2009, 17 pages.

* cited by examiner

DIFFERENTIATING IMAGE FILES IN A NETWORKED COMPUTING ENVIRONMENT

CROSS-REFERENCE TO RELATED APPLICATION

This application is a continuation of, and claims the benefit of, co-pending and co-owned U.S. patent application Ser. No. 12/938,702, filed Nov. 3, 2010. U.S. Pat. No. 8,375,575, issued Jul. 8, 2014, the entire contents of which are herein incorporated by reference.

TECHNICAL FIELD

The present invention relates to networked (e.g., cloud) computing. Specifically, the present invention relates to differentiating image files in a networked computing environment.

BACKGROUND

The cloud computing environment is an enhancement to the predecessor grid environment, whereby multiple grids and other computation resources may be further abstracted by a cloud layer, thus making disparate devices appear to an end-consumer as a single pool of seamless resources. These resources may include such things as physical or logical compute engines, servers and devices, device memory, storage devices, etc.

With many cloud systems today, it is possible for users to create an "image" (e.g., for a virtual machine instance or the like) that extends a base image with additional files or updates as modified by the user. While this technique has many advantages, one disadvantage is that it can be very difficult for users who provision particular images to understand the differences between those images.

SUMMARY

In general, embodiments of the invention provide an approach to differentiate and/or customize image files in a networked (e.g., cloud) computing environment. Specifically, a plurality of images corresponding to a requested instance, and all configuration files corresponding to the plurality of images, will be identified. In identifying the configuration files, a first subset of configuration files that are common to all of the plurality of images, and a second subset of configuration files that are unique to individual images will be determined. The user can then individually select configuration files from the two subsets, and the requested instance can be generated based thereon.

A first aspect of the present invention provides a method for selecting configuration files for images in a networked computing environment, comprising: receiving a request for an instance based on a base image; identifying a plurality of images for a requested instance, each of the plurality of images having been created based on the base image; identifying all configuration files that are associated with the plurality of images and have the same name but different content; receiving a selection of one of the plurality of images; receiving a selection of at least one of the configuration files via an interface; and generating the requested instance, the requested instance being customized based on the selection of one of the plurality of images and the selection of at least one of the identified configuration files.

A second aspect of the present invention provides a system for selecting configuration files for images in a networked computing environment, comprising: a bus; a processor coupled to the bus; and a memory medium coupled to the bus, the memory medium comprising instructions to: receive a request for an instance based on a base image; identify a plurality of images for a requested instance, each of the plurality of images having been created based on the base image; identify all configuration files that are associated with the plurality of images and have the same name but different content; receive a selection of one of the plurality of images; receive a selection of at least one of the configuration files via an interface; and generate the requested instance, the requested instance being customized based on the selection of one of the plurality of images and the selection of at least one of the identified configuration files.

A third aspect of the present invention provides a computer program product for selecting configuration files for images in a networked computing environment, the computer program product comprising a computer readable storage media, and program instructions stored on the computer readable storage media, to: receive a request for an instance based on a base image; identify a plurality of images for a requested instance, each of the plurality of images having been created based on the base image; identify all configuration files that are associated with the plurality of images and have the same name but different content; receive a selection of one of the plurality of images; receive a selection of at least one of the configuration files via an interface; and generate the requested instance, the requested instance being customized based on the selection of one of the plurality of images and the selection of at least one of the identified configuration files.

A fourth aspect of the present invention provides a method for deploying a system for selecting configuration files for images in a networked computing environment, comprising: deploying a computer infrastructure being operable to: receive a request for an instance based on a base image; identify a plurality of images for a requested instance, each of the plurality of images having been created based on the base image; identify all configuration files that are associated with the plurality of images and have the same name but different content; receive a selection of one of the plurality of images; receive a selection of at least one of the configuration files via an interface; and generate the requested instance, the requested instance being customized based on the selection of one of the plurality of images and the selection of at least one of the identified configuration files.

BRIEF DESCRIPTION OF THE DRAWINGS

These and other features of this invention will be more readily understood from the following detailed description of the various aspects of the invention taken in conjunction with the accompanying drawings in which.

Figure 1:
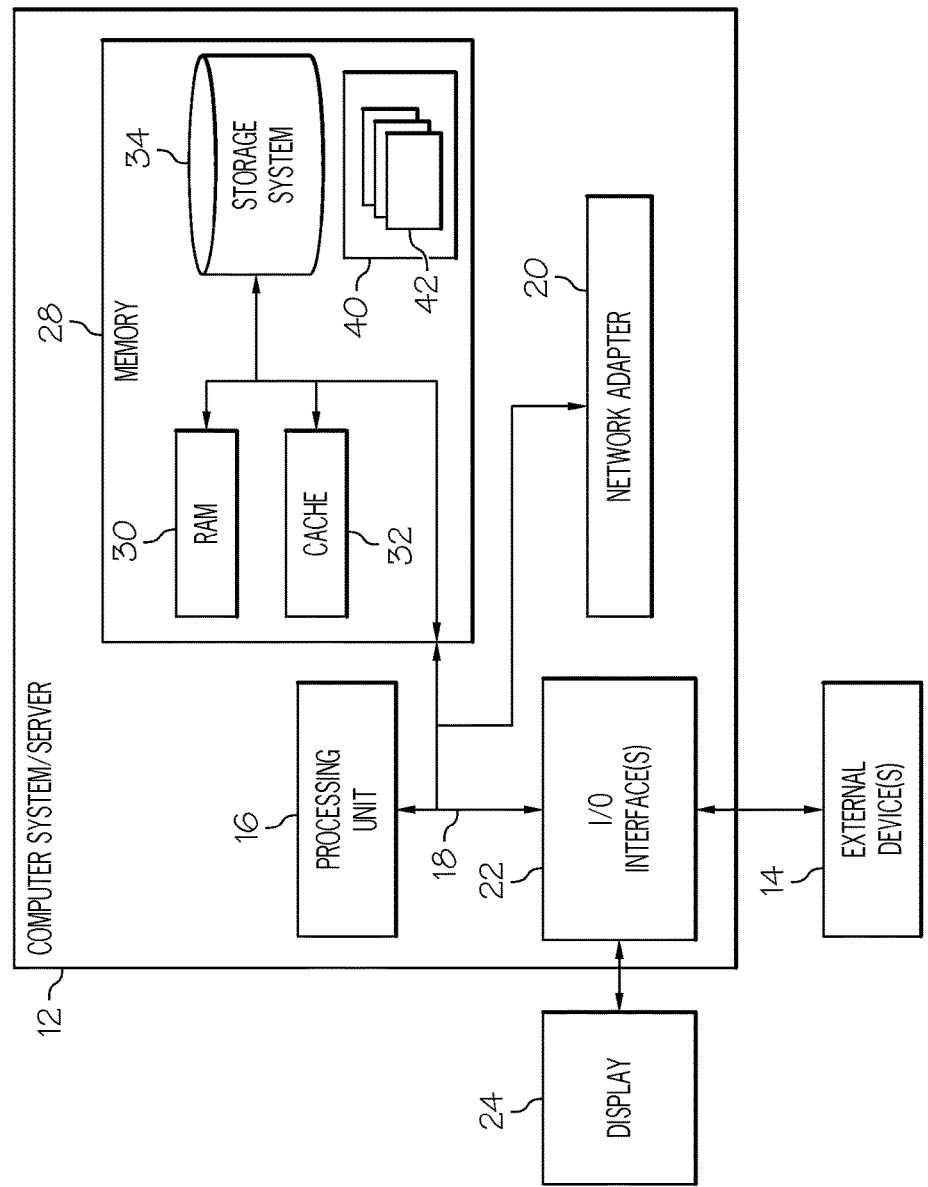
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the invention provide an approach to differentiate and/or customize image files in a networked (e.g., cloud) computing environment. Specifically, a plurality of images corresponding to a requested instance, and all configuration files corresponding to the plurality of images, will be identified. In identifying the configuration files, a first subset of configuration files that are common to all of the plurality of images, and a second subset of configuration files that are unique to individual images will be determined. The user can then individually select configuration files from the two subsets, and the requested instance can be generated based thereon.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
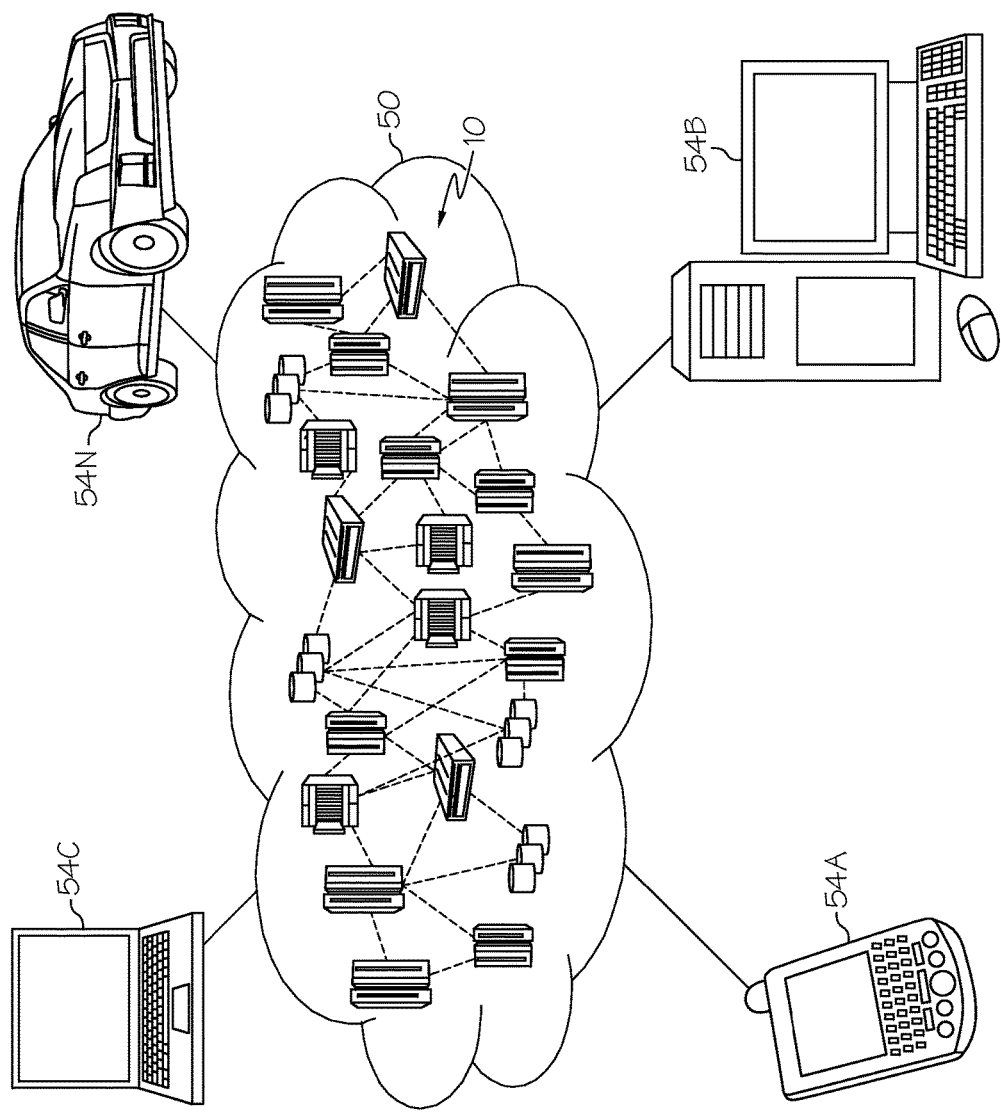
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
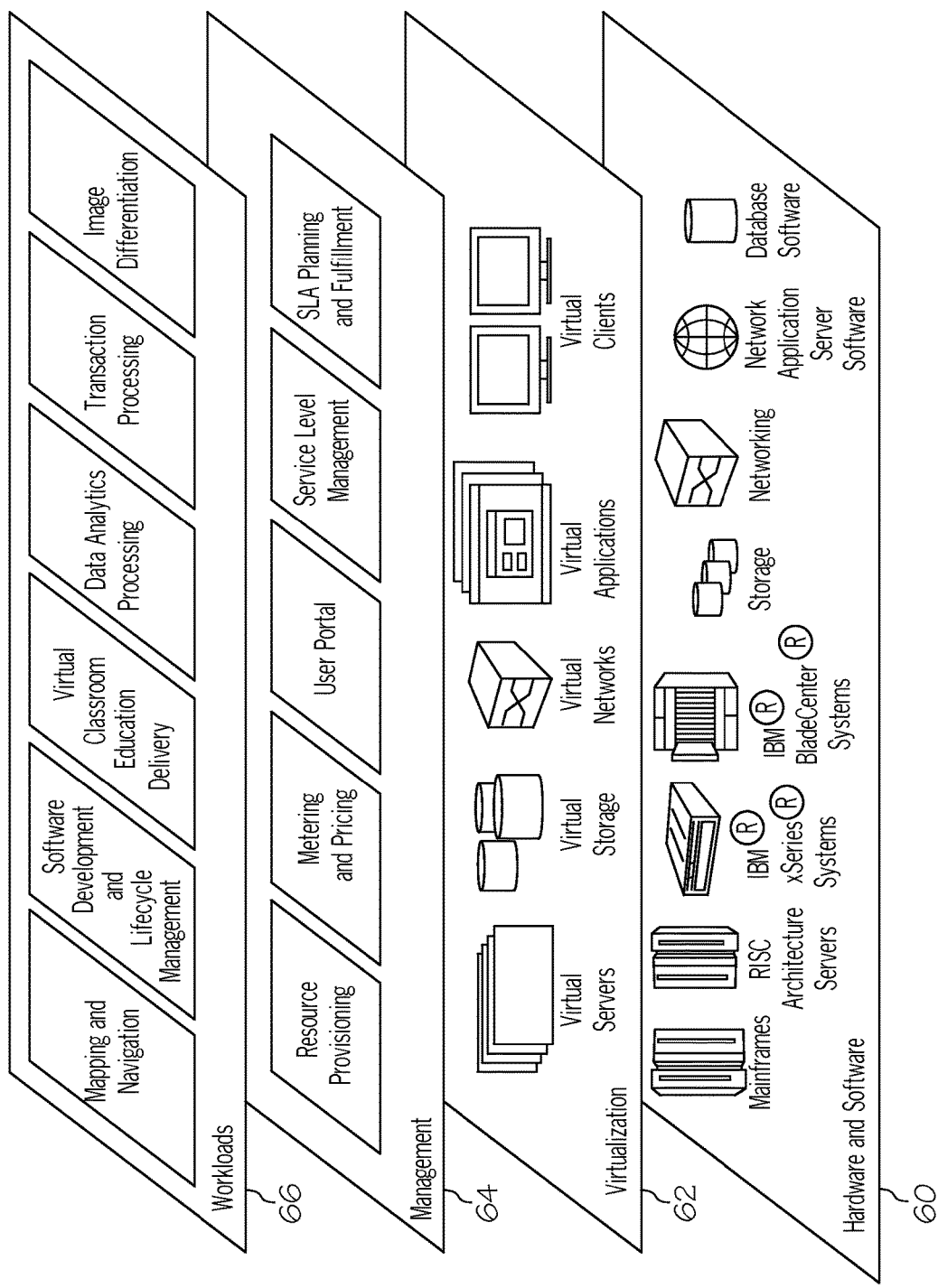
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and image differentiation. As mentioned above, all of the foregoing examples described with respect to FIG. 3 are illustrative only, and the invention is not limited to these examples.

It is understood all functions of the present invention as described herein are typically performed by the image differentiation function, which can be tangibly embodied as modules of program code 42 of node control program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

In general, configuration files are stored in a cloud asset manager, which also contains scripts and other files that are applied at the time of instance creation. When a user requests an instance from a certain image, the user is provided with the capability to pick more than one image to compare their scripts and other files. As this comparison is made, the user can either edit the files they plan to request, or select another image entirely.

Figure 4:
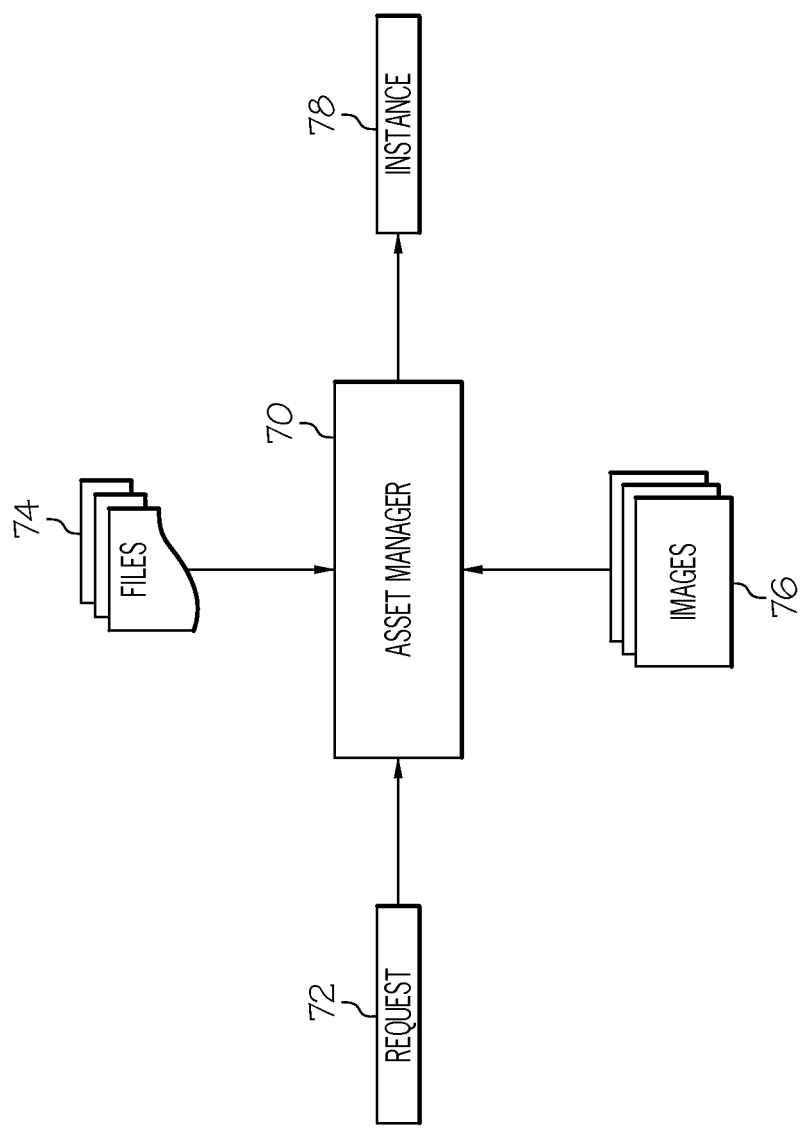
FIG. 4 depicts a component flow diagram according to an aspect of the present invention.

Referring now to FIG. 4, a component flow diagram according to an embodiment of the present invention is shown. As depicted, a request 72 for an instance is received by an asset manager 70. Based on the request, asset manager 70 will identify corresponding images 76 as well as configuration files 74 related thereto. The asset manager 70 will then allow the user to (e.g., graphically) select specific configuration files 74 from among the image(s) 76 returned. The requested instance 78 will then be generated based on the user's selection(s).

Figure 5:
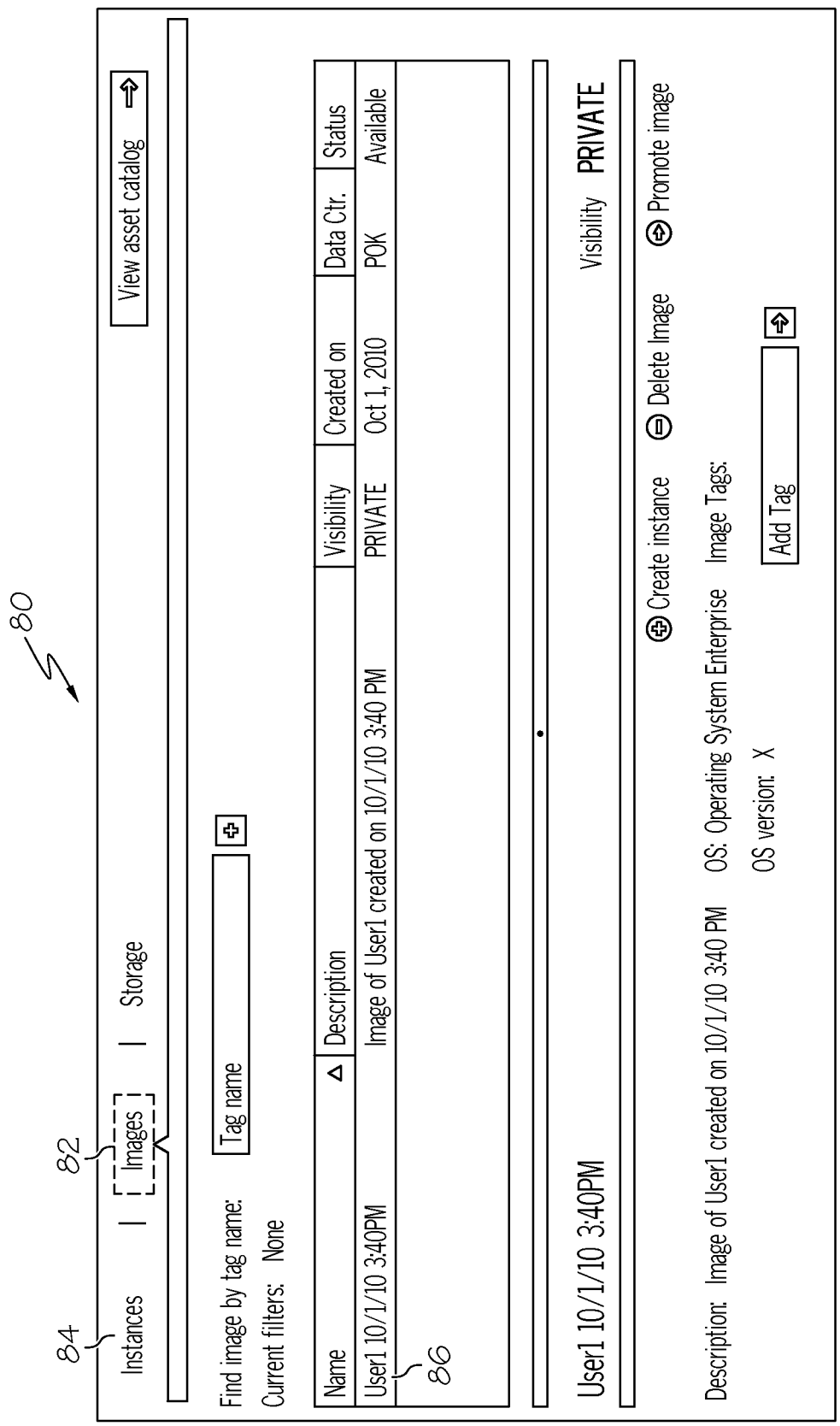
FIG. 5 depicts a screen shot according to an embodiment of the present invention.
Figure 6:
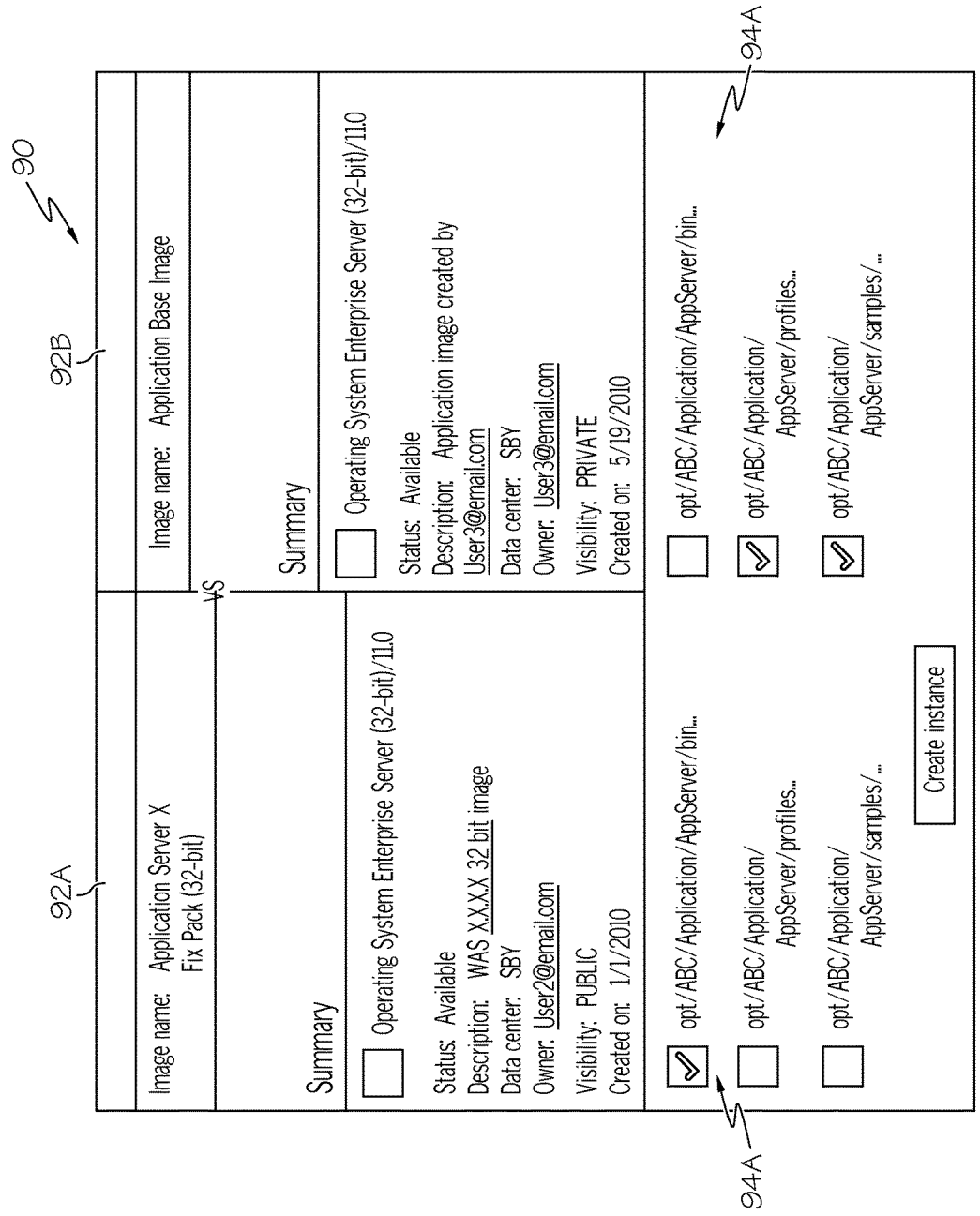
FIG. 6 depicts another screen shot according to an embodiment of the present invention.

Referring now to FIGS. 5-6, the process will be described in conjunction with a set of graphical user interfaces (GUIs). Such GUIs can typically be provided by asset manager 70 (FIG. 4) or the like as will be described in further detail below. Referring first to FIG. 5, a GUI 80 listing images 82 is shown. As indicated herein, images 82 typically represent configurational versions of instances 84 such as virtual machines. As will be shown in conjunction with FIG. 5, an image can be associated with one or more configuration files. Nevertheless, as shown in FIG. 5, a particular image 86 has been selected by a user.

Referring now to FIG. 6, a GUI 90 depicting the file section capability of the embodiments of the present invention is further shown. Specifically, GUI 90 shows two different images 92A-B corresponding to a requested instance. Each instance includes a set of configuration files 94A-B from which a user can pick and choose individual configuration files. For example, the user can generate an instance using some configuration files 94A from image 92A, and other configuration files 94B from image 92B. Along these lines, the user can be presented with multiple subsets of configuration files. One subset would identify all configuration files common to both images 92A-B, and another subset listing configuration files that are unique to either image 92A or image 92B.

Based on this approach, the following methodology could be implemented hereunder:
1. A user requests an instance from an image;
2. The user selects an option to show similar images;
3. The user selects specific images to compare their associated configuration files;
4. The system (e.g., an asset manager) traverses through each image asset and:
 a. Finds all configuration files; and/or
 b. Finds configuration files with the same name but different content;
5. Using known file comparison techniques, the asset manager displays;
 a. Differences in the configuration files; and/or
 2. Files themselves that are different;
6. At any time, the user may wish to compare additional images on a per file basis;
 a. For example, the user may wish to compare only the configuration properties of image A to the configuration properties of image B;
7. Based on the information presented, the user can make an informed decision on:
 a. Which image to choose;
 b. Which updates to apply;
 c. Which files to remove; and/or
 d. The user can select a different image and start over at step 1 or processed to step 8; and
8. The requested instance is generated based on the user's selections/customizations made in steps 1-7c.

These embodiments of the invention can also apply to image creators so that the above-referenced file comparison can be made to the image capture time. This allows the image input files to be customized for the users. Consider the following example:

Suppose a user has image A and image B that share the same base image (imageBASE). Further assume that Image B has added files X, Y, and Z in addition to imageBASE. When the two images are compared, the user would see that the differences are X, Y, and Z, and the relevance of those files can then be determined.

Figure 7:
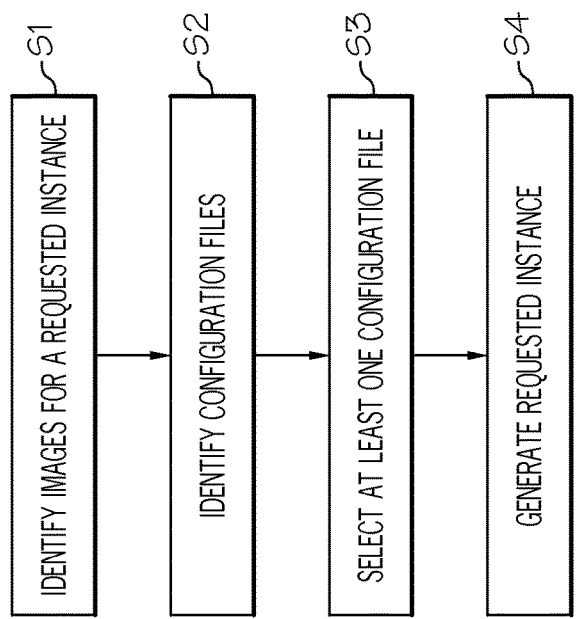
FIG. 7 depicts a method flow diagram according to an embodiment of the present invention.

Referring now to FIG. 7, a method flow diagram according to an embodiment of the present invention is shown. In step S1, a plurality of images for a requested instance (e.g., a virtual machine) are identified. In step S2, all configuration files that are associated with the plurality of images are identified. In so doing, a first subset of configuration files that are common to all of the plurality of images, and a second subset of configuration files that are unique to individual images of the plurality of images can be determined. In step S3, a selection of at least one of the configuration files can be received (from a user). In step S4, the requested instance can be generated based on the selection. Although not shown, the embodiments of the invention can further receive a selection of an image from a set of images and associate the at least one configuration file with the image.

While shown and described herein as an image differentiation solution, it is understood that the invention further provides various alternative embodiments. For example, in one embodiment, the invention provides a computer-readable/useable medium that includes computer program code to enable a computer infrastructure to provide image differentiation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide image differentiation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for image differentiation. In this case, a computer infrastructure, such as computer system 12 (FIG. 1), can be provided, and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for selecting configuration files for images in a networked computing environment, comprising:
   receiving a request for an instance based on a common base image;
   identifying a plurality of images for the requested instance, wherein each of the plurality of images has been previously created in a virtual machine instance based on the common base image modified by any added configuration files;
   identifying all configuration files that are associated with the plurality of images and have the same name but different content;
   receiving a selection of one of the plurality of images;
   receiving a selection of at least one of the all identified configuration files via an interface; and
   generating the requested instance, the requested instance being customized based on the selection of one of the plurality of images and the selection of the at least one of the identified all configuration files.

2. The method of claim 1, the identifying of the identified all configuration files further comprising:
   determining a first subset of configuration files that are common to all of the plurality of images; and
   determining a second subset of configuration files that are unique to individual images of the plurality of images, the identified all configuration files being identified based on the second subset of configuration files.

3. The method of claim 1, further comprising:
   receiving a selection of an image from a set of images; and
   associating the at least one of the identified all configuration files with the image.

4. The method of claim 3, the generating comprising generating the requested instance using the image and the at least one of the identified all configuration files.

5. The method of claim 1, the requested instance corresponding to a virtual machine.

6. The method of claim 1, the step of receiving the selection of the one of the plurality of images comprising receiving a selection of one of the plurality of images, and the step of receiving the selection of the at least one of the configuration files further comprising receiving the at least one of the identified all configuration files to be implemented with the one selected image.

7. The method of claim 1, further comprising comparing the identified all configuration files to one another to identify any differences therein, the selection of the at least one of the identified all configuration files being further based on the differences.

8. A system for selecting configuration files for images in a networked computing environment, comprising:
   a bus;
   a processor coupled to the bus; and
   a memory medium coupled to the bus, the memory medium comprising instructions to:
     receive a request for an instance based on a common base image;
     identify a plurality of images for the requested instance, wherein each of the plurality of images has been previously created in a virtual machine instance based on the common base image modified by any added configuration files;
     identify all configuration files that are associated with the plurality of images and have the same name but different content;
     receive a selection of one of the plurality of images;
     receive a selection of at least one of the identified all configuration files via an interface; and
     generate the requested instance, the requested instance being customized based on the selection of one of the plurality of images and the selection of the at least one of the identified configuration files.

9. The system of claim 8, the memory medium further comprising instructions to:
   determine a first subset of configuration files that are common to all of the plurality of images; and
   determine a second subset of configuration files that are unique to individual images of the plurality of images, the identified all configuration files being identified based on the second subset of configuration files.

10. The system of claim 8 the memory medium further comprising instructions to:
    receive a selection of an image from a set of images; and
    associate the at least one of the identified all configuration files with the image.

11. The system of claim 10, the memory medium further comprising instructions to generate the requested instance using the image and the at least one of the identified all configuration files.

12. The system of claim 8, the requested instance corresponding to a virtual machine.

13. The system of claim 8, the memory medium further comprising instructions to receive a selection of one of the plurality of images, and at least one of the identified all configuration files to be implemented with the one selected image.

14. The system of claim 8, the memory medium further comprising instructions to compare the identified all configuration files to one another to identify any differences therein, the selection of the at least one of the identified all configuration files being further based on the differences.

15. A computer program product for selecting configuration files for images in a networked computing environment, the computer program product comprising a computer readable storage device, and program instructions stored on the computer readable storage media, to:
    receive a request for an instance based on a common base image;
    identify a plurality of images for the requested instance, wherein each of the plurality of images has been previously created in a virtual machine instance based on the common base image modified by any added configuration files;

identify all configuration files that are associated with the plurality of images and have the same name but different content;
receive a selection of one of the plurality of images;
receive a selection of at least one of the identified all configuration files via an interface; and
generate the requested instance, the requested instance being customized based on the selection of one of the plurality of images and the selection of the at least one of the identified configuration files.

16. The computer program product of claim 15, further comprising program instructions stored on the computer readable storage device to:
determine a first subset of configuration files that are common to all of the plurality of images; and
determine a second subset of configuration files that are unique to individual images of the plurality of images, the identified all configuration files being identified based on the second subset of configuration files.

17. The computer program product of claim 15, further comprising program instructions stored on the computer readable storage device to:
receive a selection of an image from a set of images; and
associate the at least one of the identified all configuration files with the image.

18. The computer program product of claim 17, further comprising program instructions stored on the computer readable storage device to generate the requested instance using the image and at least one of the identified all configuration files.

19. The computer program product of claim 15, the requested instance corresponding to a virtual machine.

20. The computer program product of claim 15, further comprising program instructions stored on the computer readable storage device to receive a selection of one of the plurality of images, and at least one of the identified all configuration files to be implemented with the one selected image.

* * * * *